(12) United States Patent
Ellerbrok et al.

(10) Patent No.: US 6,302,433 B1
(45) Date of Patent: Oct. 16, 2001

(54) GAS BAG FOR A VEHICLE OCCUPANT RESTRAINT SYSTEM

(75) Inventors: Norbert Ellerbrok, Alfdorf; Norbert Lang, Leinzell, both of (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/415,725

(22) Filed: Oct. 12, 1999

(30) Foreign Application Priority Data

Oct. 23, 1998 (DE) .............................................. 298 18 946

(51) Int. Cl.⁷ ............................ B60R 21/24; B60R 21/26
(52) U.S. Cl. ........................ 280/729; 280/740; 280/743.2
(58) Field of Search .................................. 280/729, 740, 280/743.2, 743.1

(56) References Cited

U.S. PATENT DOCUMENTS

| | | | |
|---|---|---|---|
| 5,573,270 | * 11/1996 | Sogi et al. ............................ | 280/740 |
| 5,848,805 | * 12/1998 | Sogi et al. .......................... | 280/743.2 |
| 5,957,485 | * 9/1999 | Hirai ..................................... | 280/729 |
| 6,022,046 | * 2/2000 | Isomura et al. .................... | 280/743.2 |
| 6,086,092 | * 7/2000 | Hill ...................................... | 280/729 |

FOREIGN PATENT DOCUMENTS

| | | | |
|---|---|---|---|
| 1-311930 | * 12/1989 | (JP) ..................................... | 280/729 |
| 4-56652 | * 2/1992 | (JP) .................................. | 280/743.1 |

* cited by examiner

*Primary Examiner*—Peter C. English
(74) *Attorney, Agent, or Firm*—Tarolli, Sundheim, Covell, Tummino & Szabo L.L.P.

(57) ABSTRACT

A gas bag for a vehicle occupant restraint system comprises an inflation opening, a fabric piece arranged inside the gas bag opposite the inflation opening and forming an outflow opening for compressed gas which flows through the inflation opening into the gas bag, and at least one tether which is likewise arranged inside the gas bag. The tether is arranged such that the compressed gas flowing out through the outflow opening from a volume surrounded by the fabric piece, substantially does not flow against the tether.

8 Claims, 9 Drawing Sheets

GAS BAG FOR A VEHICLE OCCUPANT RESTRAINT SYSTEM

FIELD OF THE INVENTION

The invention relates to a gas bag for a vehicle occupant restraint system.

BACKGROUND OF THE INVENTION

Such gas bag comprises an inflation opening, a fabric piece which is arranged inside the gas bag opposite the inflation opening and forms an outflow opening for compressed gas which flows through the inflation opening into the gas bag, and at least one tether which is likewise arranged inside the gas bag.

The fabric piece serves to deflect in a desired direction the hot compressed gas entering into the interior of the gas bag after a gas generator has been activated. This prevents the hot compressed gas from striking directly onto the wall of the gas bag and damaging it. In addition, through the selective deflection of the compressed gas, the unfolding behavior of the gas bag can be influenced to a large extent. According to the direction of inflow of the compressed gas into the gas bag, for example it can be achieved that the gas bag firstly unfolds in lateral direction, in particular upwards and downwards towards the windscreen and towards the floor of the vehicle, and to the vehicle occupant only towards the end of the unfolding process.

The tether serves to influence the shape and the dimensions of the gas bag in particular in the unfolded state. In addition, by means of the tether also the unfolding behavior of the gas bag can be influenced. However, it is a problem that the tether can have a negative effect on the unfolding behavior which is attempted to be maintained by means of the fabric piece.

BRIEF DESCRIPTION OF THE INVENTION

The invention provides a gas bag in which the tether does not have any negative effect on the unfolding behavior of the gas bag, which is given by means of the fabric piece. According to the invention, a gas bag for a vehicle occupant restraint system comprises an inflation opening, a fabric piece arranged inside the gas bag opposite the inflation opening and forming an outflow opening for compressed gas which flows through the inflation opening into the gas bag, and at least one tether which is likewise arranged inside the gas bag. The tether is arranged such that the compressed gas flowing out through the outflow opening from a volume surrounded by the fabric piece, substantially does not flow against the tether. This ensures that the tether does not lie in front of the outflow opening and thereby does not alter in a disadvantageous manner the outflow speed and the outflow direction of the compressed gas from the volume delimited by the fabric piece, for example by the opening being covered.

BRIEF DESCRIPTION OF THE DRAWINGS

The invention is described herein below with reference to preferred embodiments, which are illustrated in the enclosed drawings, in which.

DETAILED DESCRIPTION OF THE INVENTION

Figure 1:
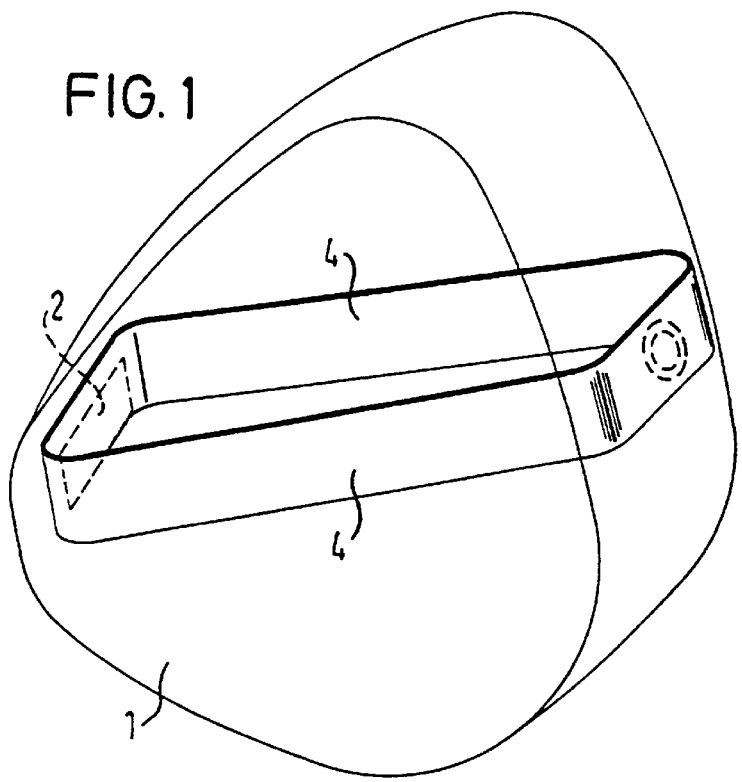
FIG. 1 shows in a perspective view a gas bag with tether.

In FIG. 1 the basic construction of a gas bag according to the invention can be seen. The gas bag 1 has an inflation opening 2 through which compressed gas can be introduced into the interior of the gas bag, in order to unfold the gas bag.

Inside the gas bag in addition two tethers 4 are arranged. In this embodiment, these connect the wall region of the gas bag, surrounding the inflation opening, with the region of the wall which faces a vehicle occupant who is to be restrained.

Figure 2:
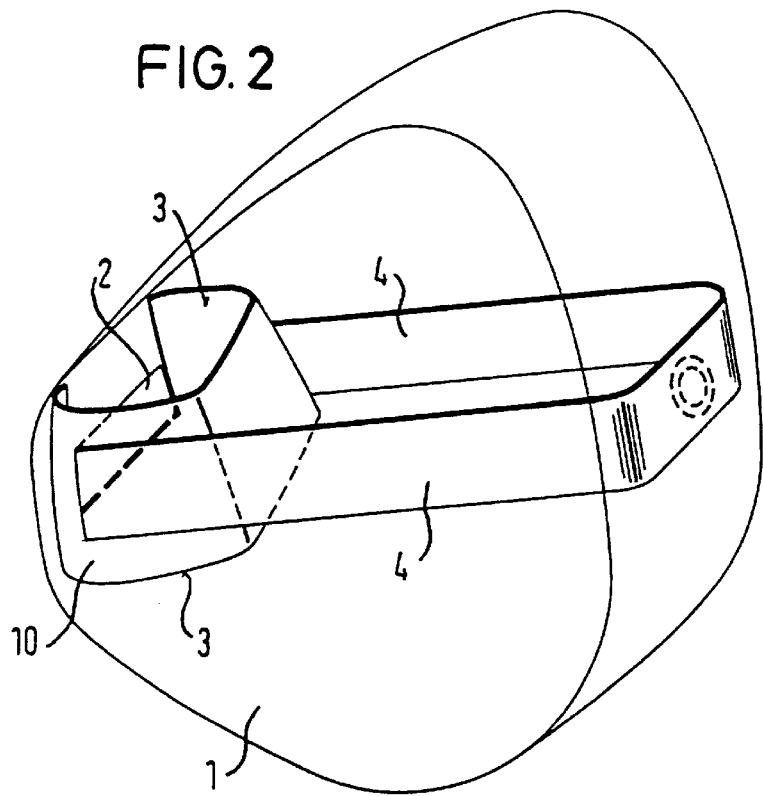
FIG. 2 shows in a perspective view the gas bag of FIG. 1 with tether and fabric piece.

In addition, FIG. 2 shows a fabric piece 10 inside the gas bag such that it forms a type of pre-chamber into which the compressed gas enters which flows in through the inflation opening. From this pre-chamber, the compressed gas flows through two outflow openings 3 into the gas bag.

An essential feature consists in that the tethers are arranged outside the region in which the compressed gas flows from the pre-chamber into the gas bag. In the embodiment of FIGS. 1 and 2, the tethers are arranged laterally on the fabric piece 10, so that they lie in a plane which is perpendicular to the plane in which the central points of the outflow openings 3 lie. Owing to this arrangement, there is also during the unfolding of the gas bag no danger that the tethers get in front of the outflow openings 3 and thereby prevent the outflow of the compressed gas from the pre-chamber or have a negative influence thereon. The constructionally provided outflow behavior from the pre-chamber is therefore maintained, so that the gas bag unfolds in the desired manner. Provision can be made in particular that the gas bag, owing to the upwardly and downwardly directed outflow openings, firstly unfolds towards the windscreen and the vehicle floor respectively, and only then towards the vehicle occupant.

Figure 3:
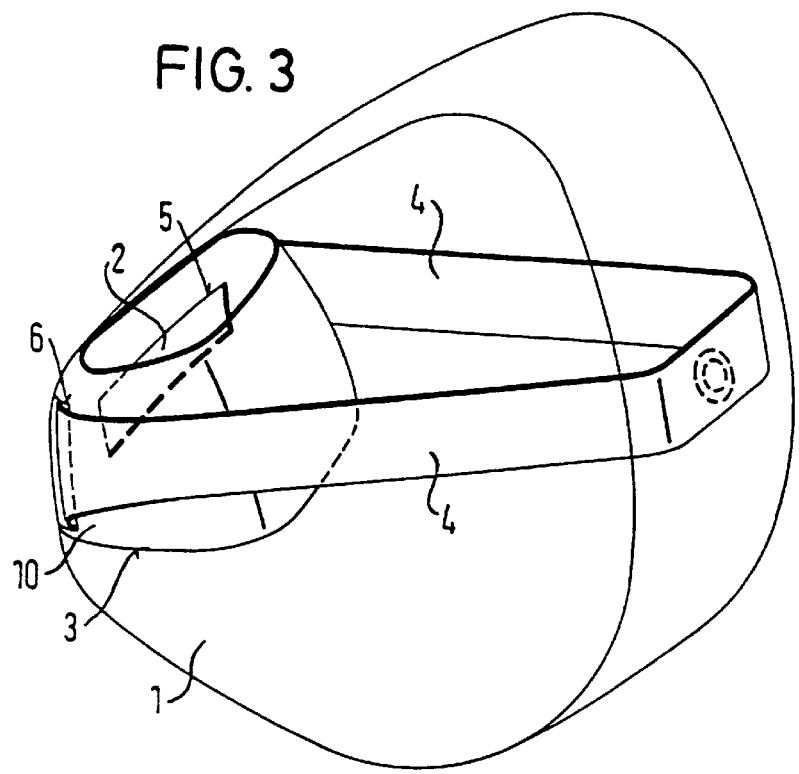
FIG. 3 shows in a perspective view a gas bag with tether and fabric piece, the tether and the fabric piece being constructed in one piece.
Figure 4:
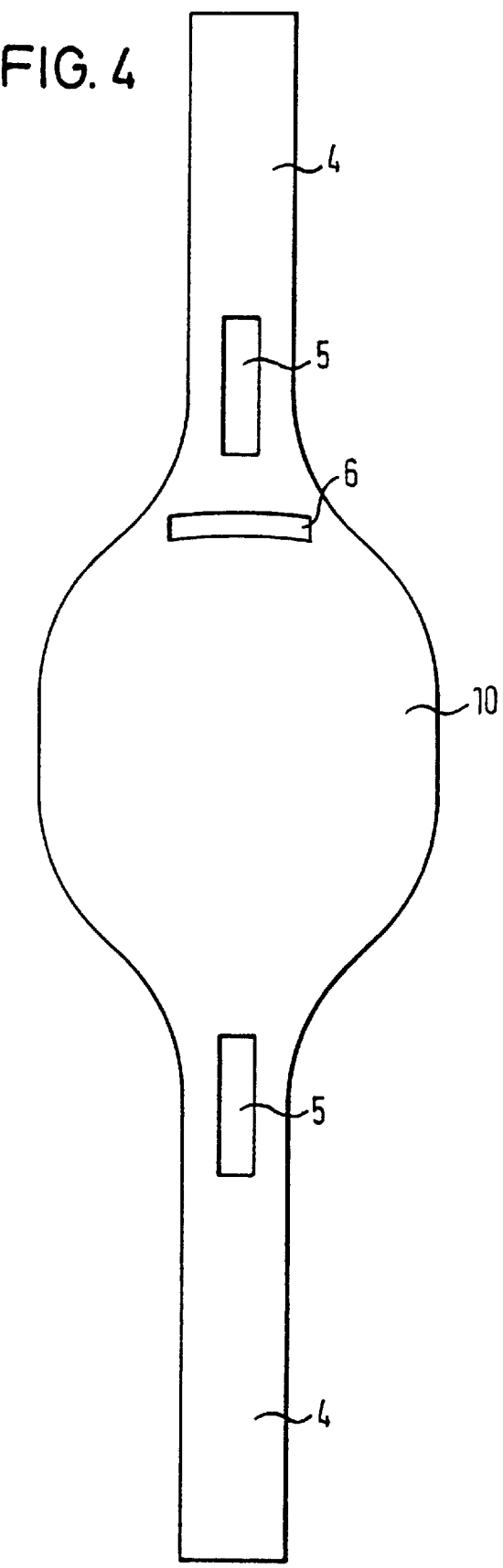
FIG. 4 shows in a top view the blank for the tether and the fabric piece of FIG. 3.

In FIG. 3 a gas bag is shown in which the fabric piece and the tethers are constructed in one piece (see also FIG. 4). The tethers are arranged on opposite sides of the fabric piece 10. Between the tethers and the fabric piece one reinforcement region each is constructed which is provided with a recess 5, the dimensions of which correspond to those of the inflation opening 2. Finally, in the region between a reinforcement region and the fabric piece an opening 6 is formed, which serves for the passage of the tether arranged on the other side.

The tethers and the fabric piece run in the following manner: The fabric piece is placed in the manner of a ring, so that the two reinforcement regions lie one on the other such that the recesses 5 coincide with the inflation opening. One of the tethers extends here through the opening 6. Thus, one tether each protrudes on both sides from the annular fabric piece 10 which forms the pre-chamber. The fabric piece is sewn with the wall region of the gas bag which surrounds the inflation opening, or is connected for example by a holding ring. The free ends of the tethers are sewn with the region of the wall of the gas bag which faces a vehicle occupant who is to be restrained.

Figure 5:
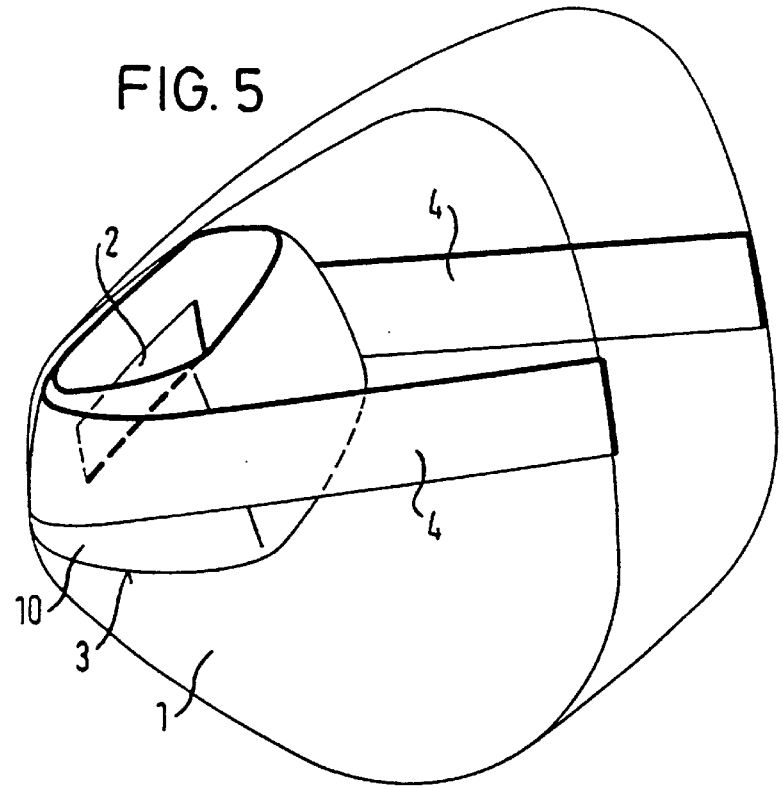
FIG. 5 shows in a perspective view a gas bag with tether and fabric piece according to a modified embodiment.

In FIG. 5 a further embodiment is shown. In contrast to the embodiment according to FIG. 3, the tethers are not sewn centrally with the region of the wall of the gas bag which faces a vehicle occupant who is to be restrained, but rather laterally in the region of the seam which connects the side pieces of the wall of the gas bag with the central wall piece.

Figure 6:
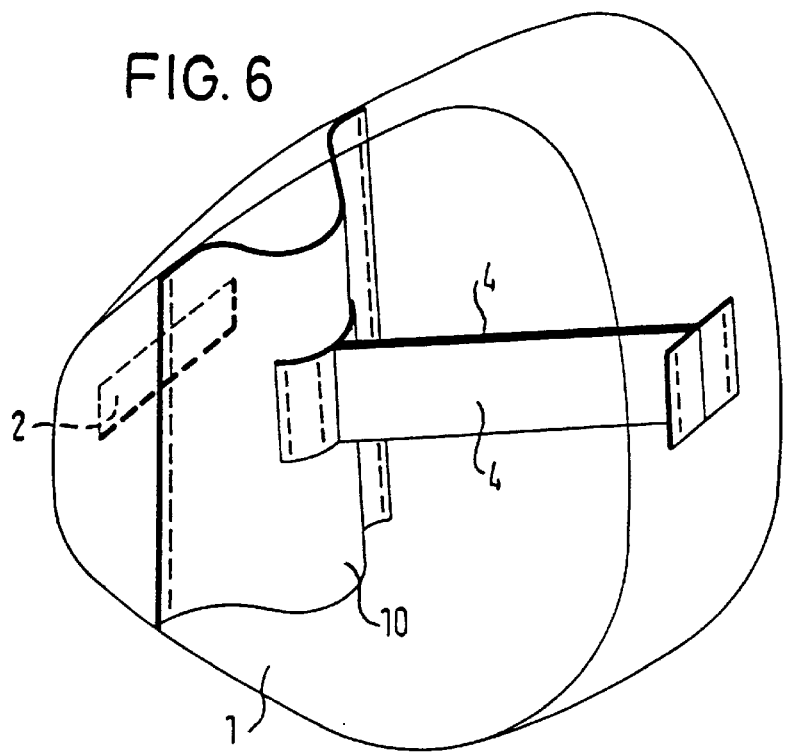
FIG. 6 shows in a perspective view a gas bag with tether and fabric piece according to a further embodiment.
Figure 7:
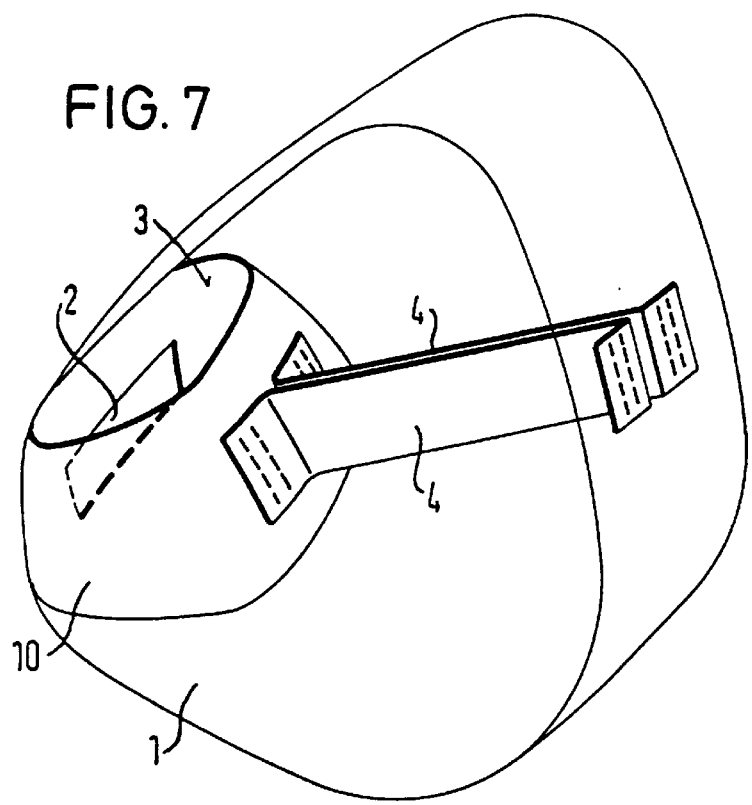
FIG. 7 shows in a perspective view a gas bag with tether and fabric piece according to an additional further embodiment.

In FIGS. 6 and 7 each, a further embodiment is shown. In contrast to the preceding embodiments, the tethers 4 are not arranged laterally on the fabric piece 10 but rather engage centrally in a region opposite the inflation opening 2 on the fabrice piece 10. The fabric piece of FIG. 6 is sewn with its outer edges to the wall of the gas bag. The fabric piece of FIG. 7 has an annular shape, as is known from FIG. 3. In both embodiments, two tethers lying against each other are used, the free ends of which are sewn in opposite directions to the fabric piece 10 and to the wall of the gas bag, respectively.

Figure 8:
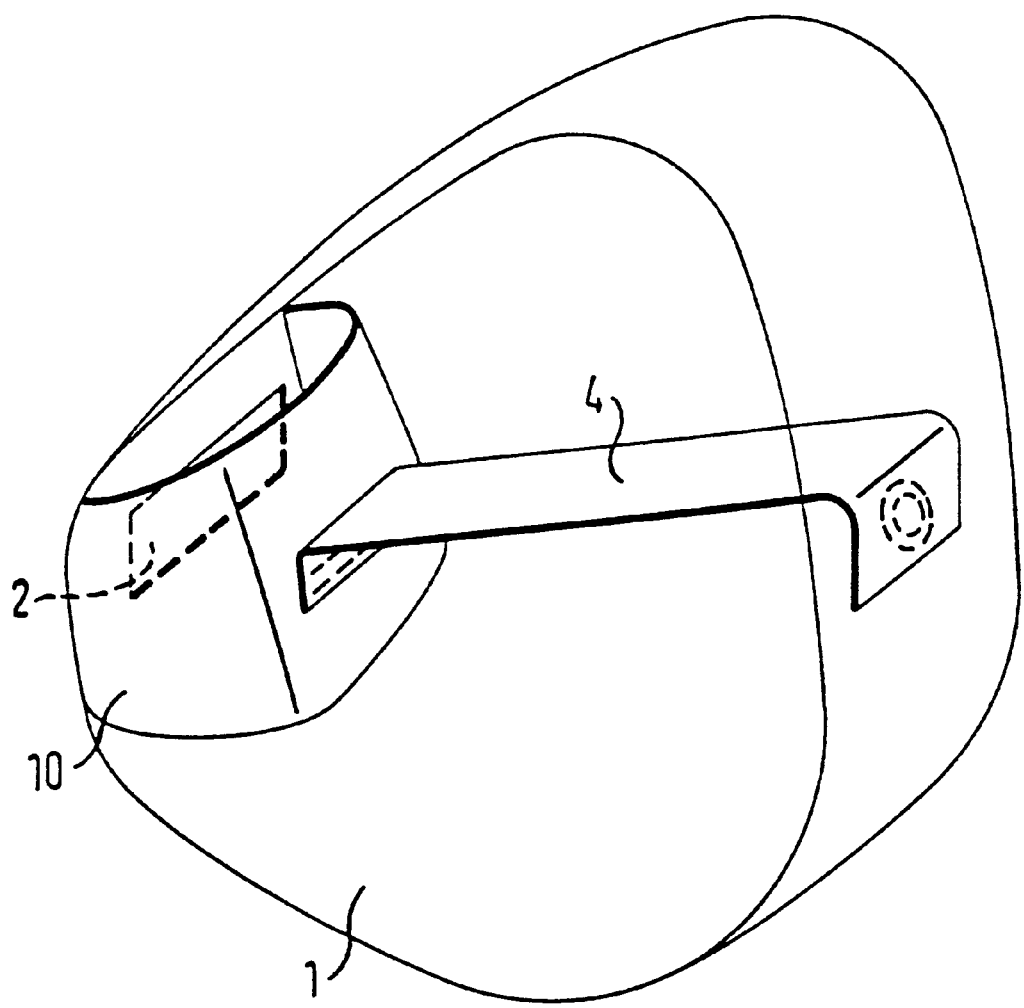
FIG. 8 shows in a perspective view a gas bag with tether and fabric piece according to an alternative embodiment.

In FIG. 8 a variant of the embodiment of FIG. 7 is shown. In this variant, only a single tether 4 is used, which is sewn centrally onto the fabric piece 10 in a region lying opposite the inflation opening 2.

Hereinbelow, a particular embodiment of a fabric piece 10 is shown, which can be used together with the tethers 4. For better clarity, the tethers are no longer shown. However, it can easily be seen that the tethers, in an identical manner to that in the preceding embodiments, can be constructed either in one piece with the fabric piece or sewn to the fabric piece.

Figure 9:
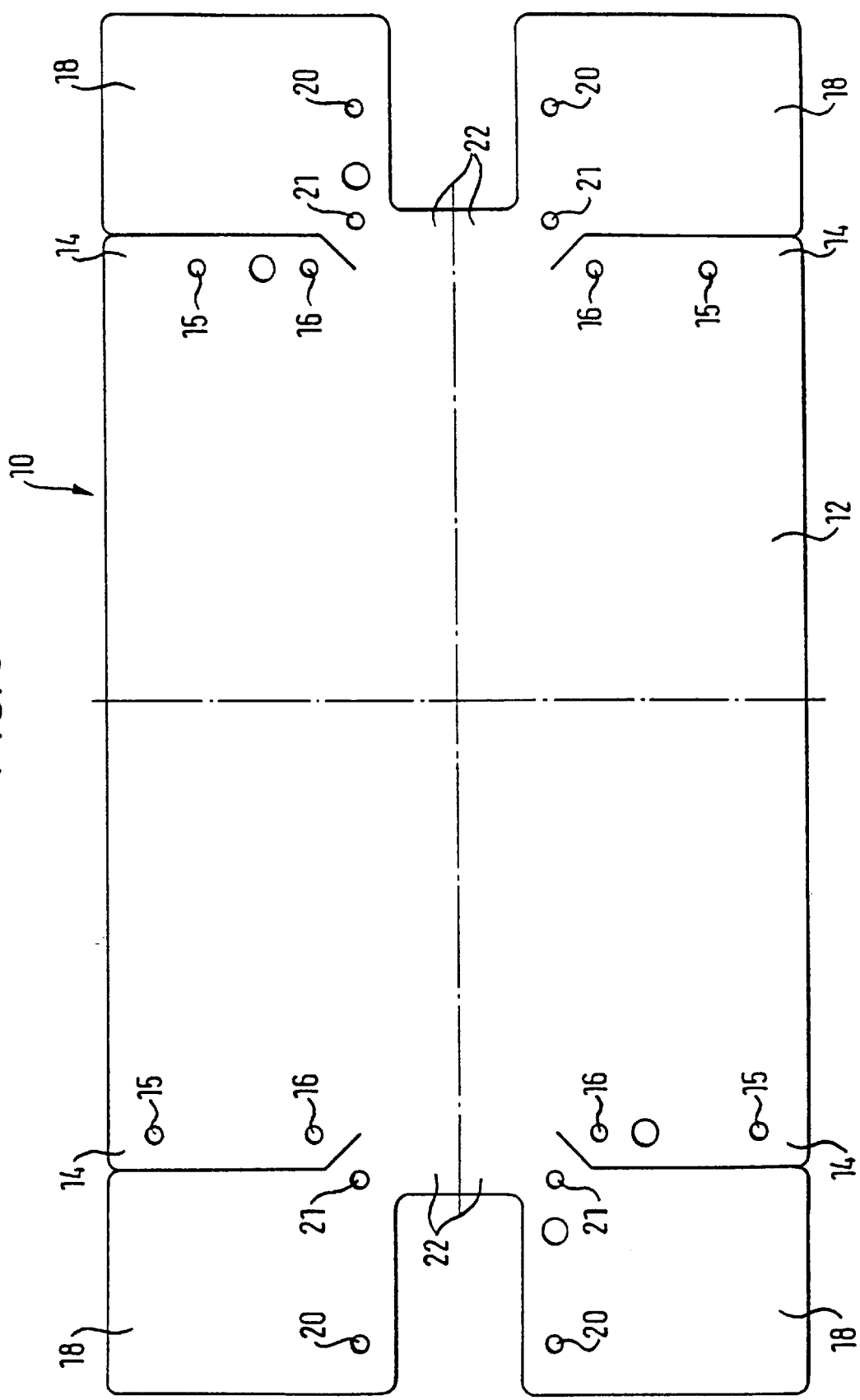
FIG. 9 shows in a top view a blank for a further embodiment of the fabric piece.

In FIG. 9 the fabric piece 10 is shown, spread out, which can be cut in one piece from a strip of fabric. The fabric piece 10 contains a central section 12 which is provided with four fastening sections 14. Each fastening section 14 extends along one of the shorter outer edges of the central section 12 starting from a longer outer edge towards the central longitudinal axis, the fastening sections terminating at a distance from the central longitudinal axis. Each fastening section 14 is provided with two openings 15, 16.

Adjoining each fastening section 14 a rectangular reinforcement section 18 is arranged. Each reinforcement section 18 is provided with two openings 20, 21. The openings 15, 16 arranged in the fastening section 14 lie on a straight line which is perpendicular to the straight line on which the openings 20, 21 of the reinforcement section 18 are arranged.

Each reinforcement section 18 is connected with the central section 12 by a transition section 22 which adjoins the corresponding shorter outer edge in a region between the central longitudinal axis of the central section 12 and the fastening section 14. Adjoining each of the shorter outer edges are therefore a fastening section 14, two transition sections 22 and a further fastening section 14, the two fastening sections together occupying approximately two thirds of the length of the corresponding shorter outer edge.

Figure 10:
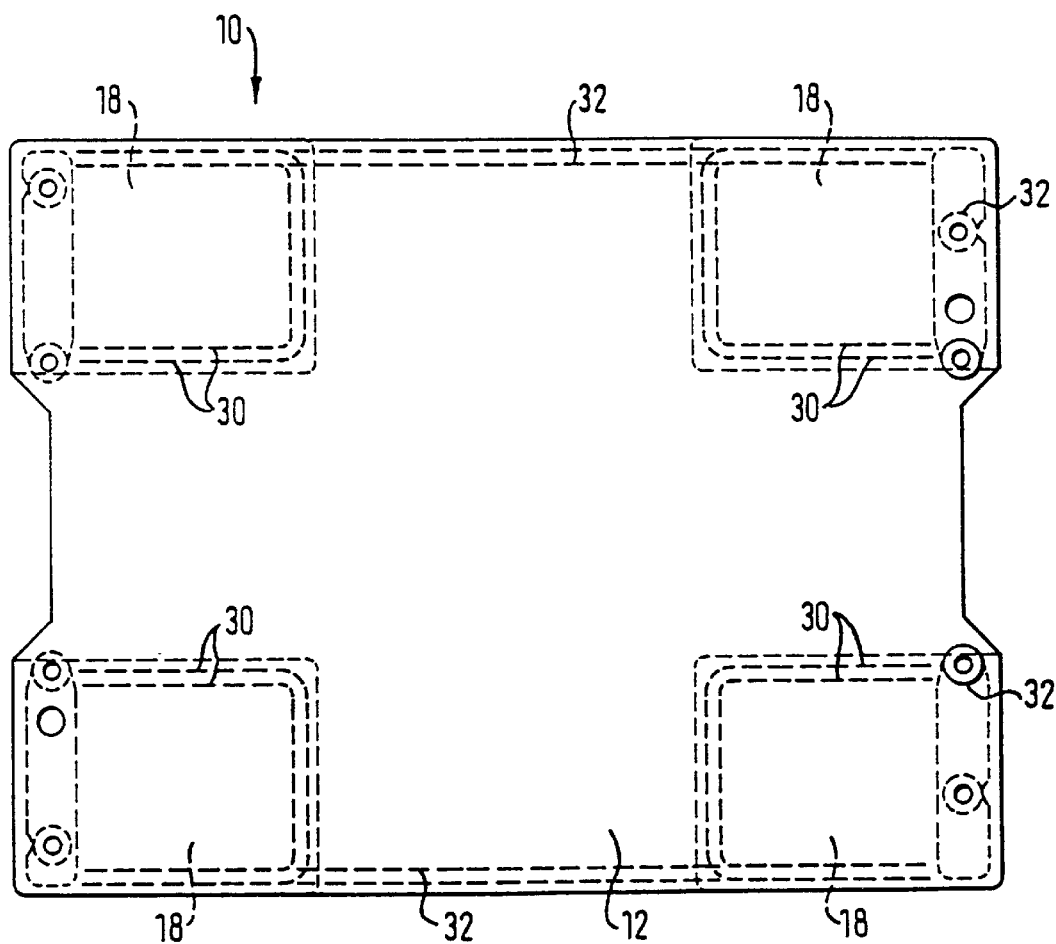
FIG. 10 shows in a developed illustration the fabric piece of FIG. 11.
Figure 11:
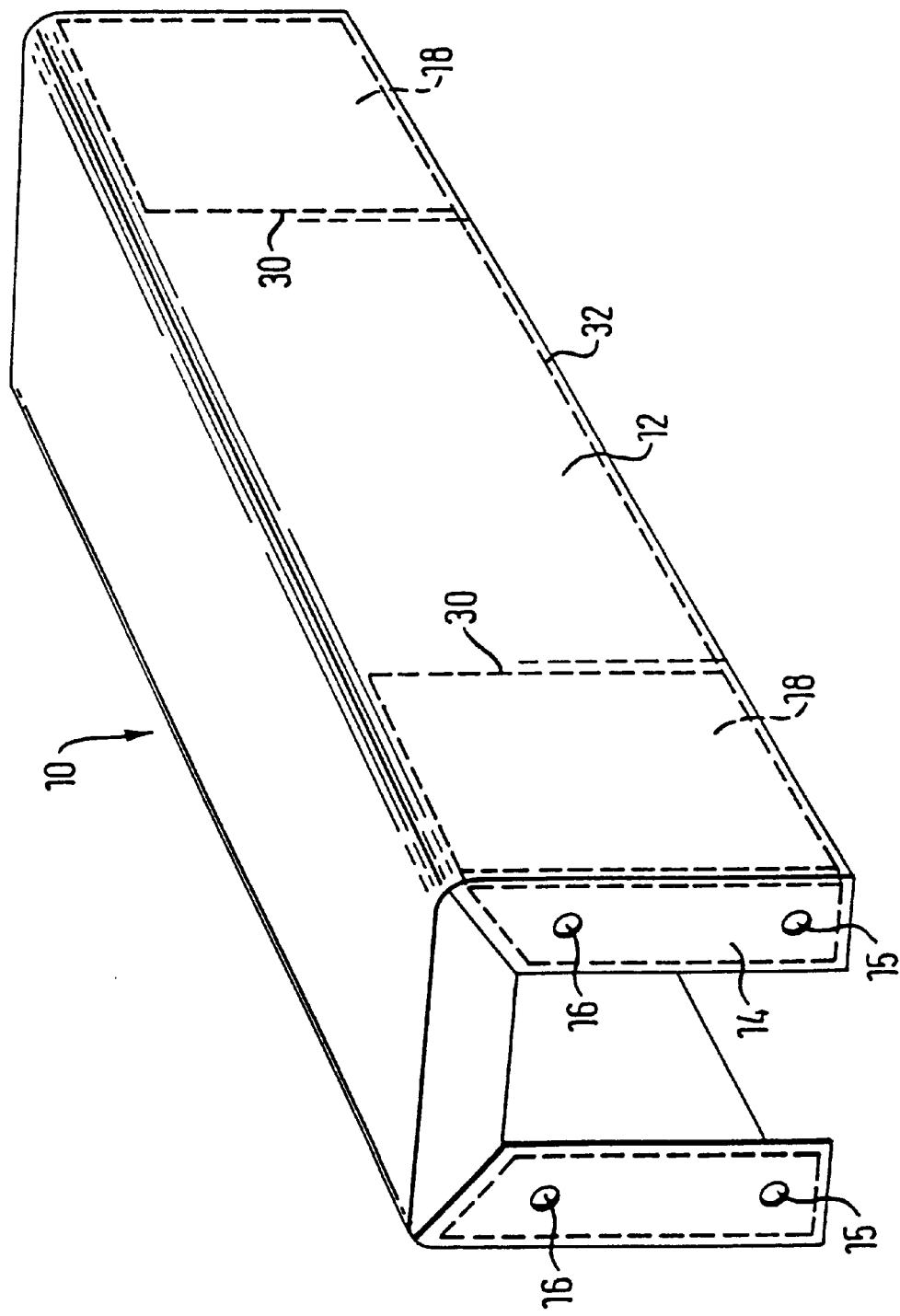
FIG. 11 shows in a perspective view the fabric piece of FIG. 9 in a sewn, three-dimensional state.

In FIG. 11 the fabric piece 10 is shown in a three-dimensional state, sewn together. This is obtained starting from the two-dimensional blank, shown in FIG. 9, in the following manner: The reinforcement sections 18 are pushed onto the side of the central section 12, which is later to form the inner face of the fabric piece, and are turned such that the opening 21 of the reinforcement piece 18 coincides with the opening 16 of the fastening section 14 and the opening 20 of the reinforcement section coincides with the opening 15 of the fastening section. For this purpose, the reinforcement sections 18 must be turned through approximately 90° about a point which lies in the region of the connection section 22, and also must be folded likewise through approximately 90° around an edge which is situated in the region of the connection section 22. This state is shown in FIG. 10, in fact projected into one plane. If the reinforcement sections 18 are then sewn with the fastening sections 14 and the central section 12, the approximately trough-shaped form shown in FIG. 11 (shown turned over here) is produced, in which the central section 12 forms the two side walls and the base of the trough. The fastening section 14 form a part of the end faces of the trough, a passage remaining between the fastening sections which lie opposite each other. In FIGS. 10 and 11, seams by means of which the reinforcement sections 18 are connected with the fastening section 14 and the central section 12, are given the reference number 30. Seams which only serve to reinforce the outer edge and the openings 15, 16, 20 21 respectively, are given the reference number 32.

Figure 12:
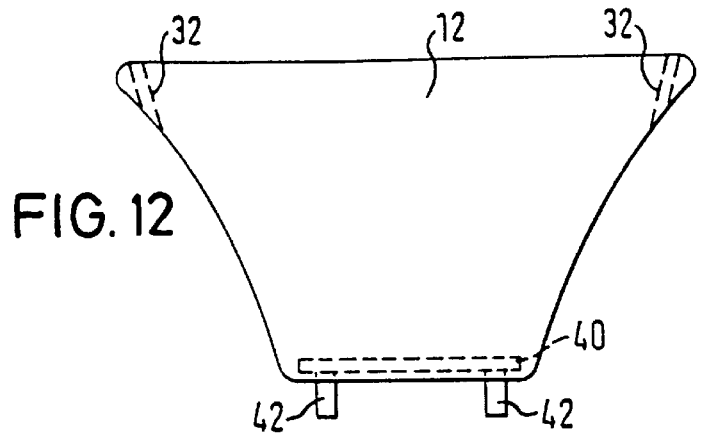
FIG. 12 shows in a first side view the fabric piece of FIG. 10 fastened on a holding frame.
Figure 13:
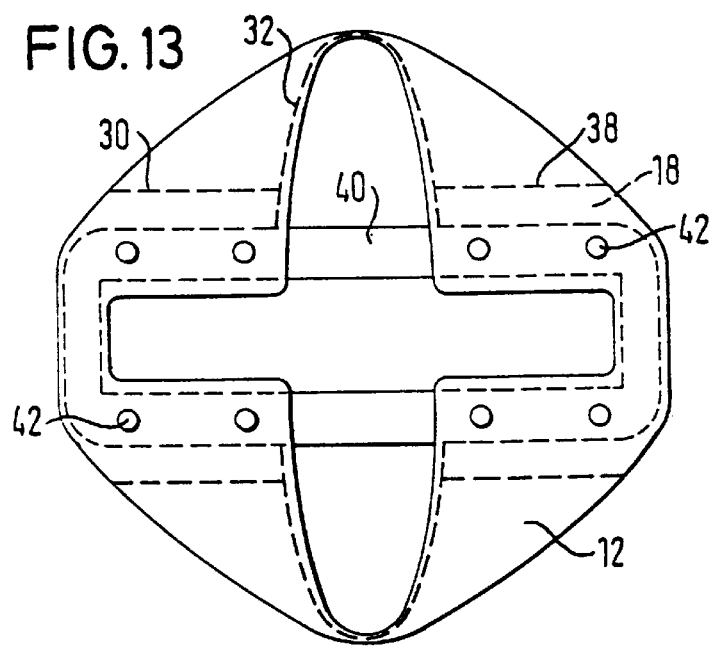
FIG. 13 shows in a bottom view the holding frame with the fabric piece of FIG. 10 fastened thereon; and, FIG. 14 shows in a second side view the fabric piece of FIG. 10 fastened to the holding frame.
Figure 14:
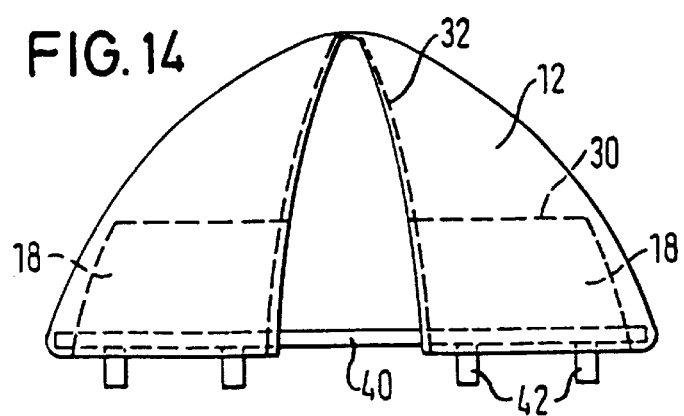

In FIGS. 12 to 14, the finished, sewn-together fabric piece 12 is shown, which is arranged on a holding frame 40. The holding frame serves to secure a gas bag to the housing of the gas bag module. Fastening bolts 42 let in the holding frame 40 serve to do this, which bolts 42 pass through the openings 15, 16, 20, 21.

When the fabric piece 12 is fastened to the holding frame 40, the fastening sections 14 are situated in one and the same plane. The part of the central section 12 which previously represented the base of the trough formed by the central section now extends starting from one end face of the frame in an arc to the other end face. The longer outer edges of the central section 12 extend approximately in the form of a half ellipse starting from the corresponding longitudinal side of the holding frame.

The fabric piece 10 therefore forms a pre-chamber over the holding frame 40. Compressed gas which flows in through the holding frame 40 into the pre-chamber, emerges from the pre-chamber through two outlet openings which are formed between the holding frame and one of the longer outer edges of the central section. In this way, the outflow direction of the compressed gas is predefined.

What is claimed is:

1. A gas bag for a vehicle occupant restraint system, comprising an inflation opening, a fabric piece arranged inside said gas bag opposite said inflation opening and forming an outflow opening for compressed gas which flows through said inflation opening into said gas bag, and at least one tether which is likewise arranged inside said gas bag, said tether being arranged such that said compressed gas flowing out through said outflow opening from a volume surrounded by said fabric piece, substantially does not flow against said tether, said fabric piece when spread out flat having a generally rectangular central section and also four fastening sections, said fastening sections being arranged on shorter outer edges of said central section such that they extend starting from longer outer edges along the shorter outer edges toward a central longitudinal axis of the central section, said fastening sections each ending at a distance from said central longitudinal axis.

2. The gas bag of claim 1, wherein generally rectangular reinforcement sections are connected by means of transition sections to said shorter outer edges of said central section in the areas not occupied by said fastening sections.

3. The gas bag according to claim 2, wherein said transition sections of reinforcement sections arranged on the same shorter outer edge adjoin each other and extend together over all regions of said same shorter outer edge, over which said fastening sections do not extend.

4. The gas bag of claim 3, wherein said fastening sections arranged on the same shorter outer edge extend together over approximately two thirds of its length and said transition sections arranged on said same shorter outer edge extend over approximately one third of this length.

5. The gas bag of claim 2, wherein in said fastening sections and said reinforcement sections two openings each are constructed for the passage of fastening bolts.

6. The gas bag of claim 5, wherein said two openings formed in each fastening section lie on a straight line which is perpendicular to a straight line on which said two openings of said reinforcement section adjoining the corresponding fastening section lie.

7. The gas bag of claim 5, wherein each of said reinforcement sections is sewn to an associated fastening section such that said openings in said reinforcement section and said fastening section are arranged so as to be coincident, whereby said fabric piece assumes a three-dimensional, trough-shaped form, the central section forming two side walls and a base of the trough and two fastening sections each forming end faces of the trough, a passage remaining between said fastening sections which lie opposite each other.

8. The gas bag of claim 7, wherein said sewn fabric piece with its openings is fitted onto fastening bolts which are provided in a holding frame for a gas bag module, said fastening sections being situated in one plane and said fabric piece forming a pre-chamber, the base of which is determined by said holding frame, compressed gas flowing into said pre-chamber being able to emerge from said pre-chamber through two outlet openings which are each formed between said holding frame and one of the longer outer edges of said central section.

\* \* \* \* \*